United States Patent
Kim et al.

(10) Patent No.: US 8,040,307 B2
(45) Date of Patent: Oct. 18, 2011

(54) 2D/3D LIQUID CRYSTAL DISPLAY DEVICE AND METHOD FOR DRIVING THE SAME

(75) Inventors: Beom-Shik Kim, Yongin-si (KR); Hui Nam, Yongin-si (KR); Chan-Young Park, Yongin-si (KR); Ja-Seung Ku, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 990 days.

(21) Appl. No.: 11/940,957

(22) Filed: Nov. 15, 2007

(65) Prior Publication Data

US 2008/0252578 A1     Oct. 16, 2008

(30) Foreign Application Priority Data

Apr. 12, 2007   (KR) .................. 10-2007-0036006

(51) Int. Cl.
*G09G 3/36*     (2006.01)
(52) U.S. Cl. ................... 345/87; 345/6; 345/96
(58) Field of Classification Search ............... 345/6, 84, 345/87–100, 204, 208, 209, 419; 348/42
See application file for complete search history.

(56) References Cited

U.S. PATENT DOCUMENTS

| 5,945,965 A * | 8/1999 | Inoguchi et al. ............. 345/6 |
| 2006/0087499 A1* | 4/2006 | Chen et al. .................. 345/204 |
| 2009/0046143 A1* | 2/2009 | Hiddink et al. ............... 345/6 |
| 2009/0128474 A1* | 5/2009 | Ijzerman ..................... 345/94 |

FOREIGN PATENT DOCUMENTS

| JP | 03-119889 | 5/1991 |
| JP | 2004-271617 A | 9/2004 |
| JP | 2004-294861 A | 10/2004 |
| KR | 10-2006-0076986 | 7/2006 |

OTHER PUBLICATIONS

Patent Abstracts of Japan for Publication No. 2004-271617; dated Sep. 30, 2004 in the name of Akio Ota.
Patent Abstracts of Japan for Publication No. 2004-294861 A; dated Oct. 21, 2004 in the name of Kei Tamura et al.

* cited by examiner

*Primary Examiner* — Regina Liang
(74) *Attorney, Agent, or Firm* — Christie, Parker & Hale, LLP

(57) ABSTRACT

A 2D/3D image display device including a display unit with a plurality of gate lines, a plurality of data lines, and a plurality of pixels, the plurality of gate lines crossing the plurality of data lines, and the plurality of pixels being coupled to the plurality of gate lines and the plurality of data lines; and a controller for receiving an input signal and setting a first driving frequency or a second driving frequency according to the input signal. An image of one frame operating according to the second driving frequency receives and displays the same image data for each of a first period and a second period, a video signal transmitted to one of the plurality of pixels for the first period has first polarity, and a video signal transmitted to one of the plurality of pixels for the second period has second polarity.

20 Claims, 11 Drawing Sheets

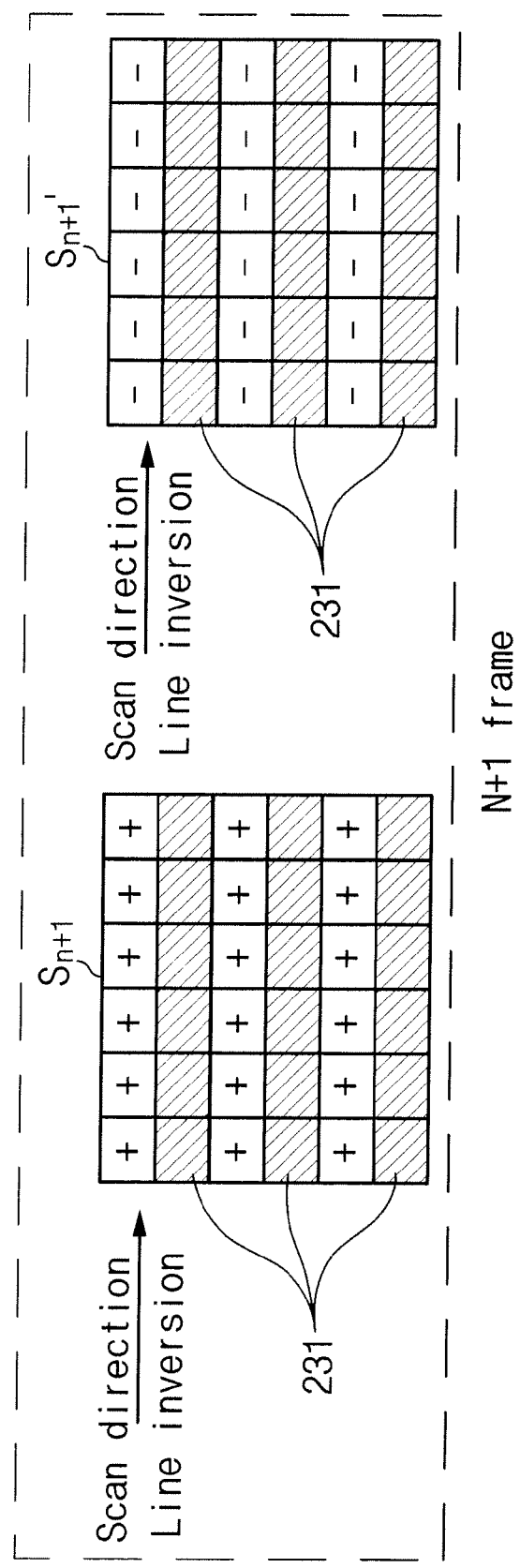

2D/3D LIQUID CRYSTAL DISPLAY DEVICE AND METHOD FOR DRIVING THE SAME

CROSS-REFERENCE TO RELATED APPLICATION

This application claims priority to and the benefit of Korean Patent Application No. 10-2007-0036006 filed in the Korean Intellectual Property Office on Apr. 12, 2007, the entire content of which is incorporated herein by reference.

BACKGROUND OF THE INVENTION

1. Field of the Invention

The present invention relates to a 2D/3D image display device and a method of driving the same.

2. Description of the Related Art

In general, a person senses a three-dimensional (3D) effect due to a physiological factor and an experimental factor. In 3D image display technology, a 3D object is generally displayed using a binocular parallax (i.e., the apparent displacement of an object as seen between a viewer's left and right eyes), which is the largest factor that can create a 3D effect in a local area.

In general, a 3D image display device creates a 3D image by spatially separating a left image and a right image from each other using optical elements. For example, a method of using a lenticular lens array and a method of using a parallax barrier are used.

Today, a 3D image display device that can display both a 2D image and a 3D image has been developed and commercially used. A display device in which a display panel includes a liquid crystal layer element exists among 3D image display devices that can selectively display a 2D image and a 3D image.

An image signal of one frame of the 3D image display device including the liquid crystal layer element includes positive (+) polarity and negative (−) polarity according to a line inversion method. An image of a frame is displayed with luminance according to a potential difference between positive (+) polarity and a common voltage Vcom, or negative (−) polarity and Vcom. A difference in luminance between frames occurs due to a correspondence in the direction of the arrangement of optical elements and a scan direction, generating a flicker phenomenon.

The above information disclosed in this Background section is only to enhance understanding of the background and therefore it may contain information that does not form the prior art that is already known in this country to a person of ordinary skill in the art.

SUMMARY OF THE INVENTION

Aspects of embodiments of the present invention are directed toward a 2D/3D image display device and a method of driving the same, having the advantage of reducing or preventing a flicker phenomenon while displaying a 3D image.

A 2D/3D image display device according to an exemplary embodiment of the present invention includes a display unit and a controller. The display unit comprises a plurality of gate lines for transmitting gate signals, a plurality of data lines that cross the plurality of gate lines, and a plurality of pixels that are coupled to the plurality of gate lines and the plurality of data lines. The controller receives an input signal and sets a driving frequency as either a first driving frequency or a second driving frequency, according to the input signal. The image display device, when operating according to the second driving frequency, receives and displays the same image data for each of a first period and a second period of an image of one frame. A video signal transmitted to one of the plurality of pixels for the first period has a first polarity, and a video signal transmitted to one of the plurality of pixels for the second period has a second polarity.

An image of one frame may be displayed with luminance according to a potential difference between the first polarity and a common voltage (Vcom) for the first period, and with luminance according to a potential difference between the second polarity and Vcom for the second period. The first polarity may be a signal having a voltage level higher than that of Vcom, and the second polarity may be a signal having a voltage level lower than that of Vcom.

The controller may include a 2D/3D determination unit for determining whether the input signal is a 2D image signal or a 3D image signal, and transmitting the determined result to a timing controller. The timing controller sets the driving frequency to the first driving frequency when a 2D image is displayed according to the 2D image signal, or it sets the driving frequency to the second driving frequency when a 3D image is displayed according to the 3D image signal. An image processor generates 2D image data or 3D image data based on the 2D image signal or the 3D image signal.

The display unit may include a barrier that is suitably placed in correspondence to the arrangement of a plurality of left eye pixels and right eye pixels, to enable the perception of a 3D image. According to a barrier control signal, if the input signal is a 2D image signal, the barrier may be set to a transmission area, and if the input signal is a 3D image signal, the barrier may be set to a suitable arrangement of transmission areas and non-transmission areas.

Another embodiment of the present invention provides a method of driving a 2D/3D display device including a display unit for displaying a 2D image or 3D image according to an input signal. This method includes determining whether the input signal is a 2D image signal or a 3D image signal, and if the input signal is a 2D image signal, driving with a first driving frequency for a period in which the 2D image is displayed according to the 2D image signal. If the input signal is a 3D image signal, driving with a second driving frequency, which is different from the first driving frequency, for a period in which the 3D image is displayed according to the 3D image signal. The method also includes displaying image data of the input signal according to the first driving frequency or the second driving frequency. The method may further include generating and transmitting image data corresponding to each of the first driving frequency and the second driving frequency, and generating and transmitting a control signal for controlling the display unit according to the first driving frequency or the second driving frequency.

BRIEF DESCRIPTION OF THE DRAWINGS

FIGS. 8A and 8B are diagrams illustrating the polarity of a video signal for a frame image when a 3D image is displayed with a second driving frequency, according to an exemplary embodiment of the present invention.

DETAILED DESCRIPTION OF THE EMBODIMENTS

Figure 1:
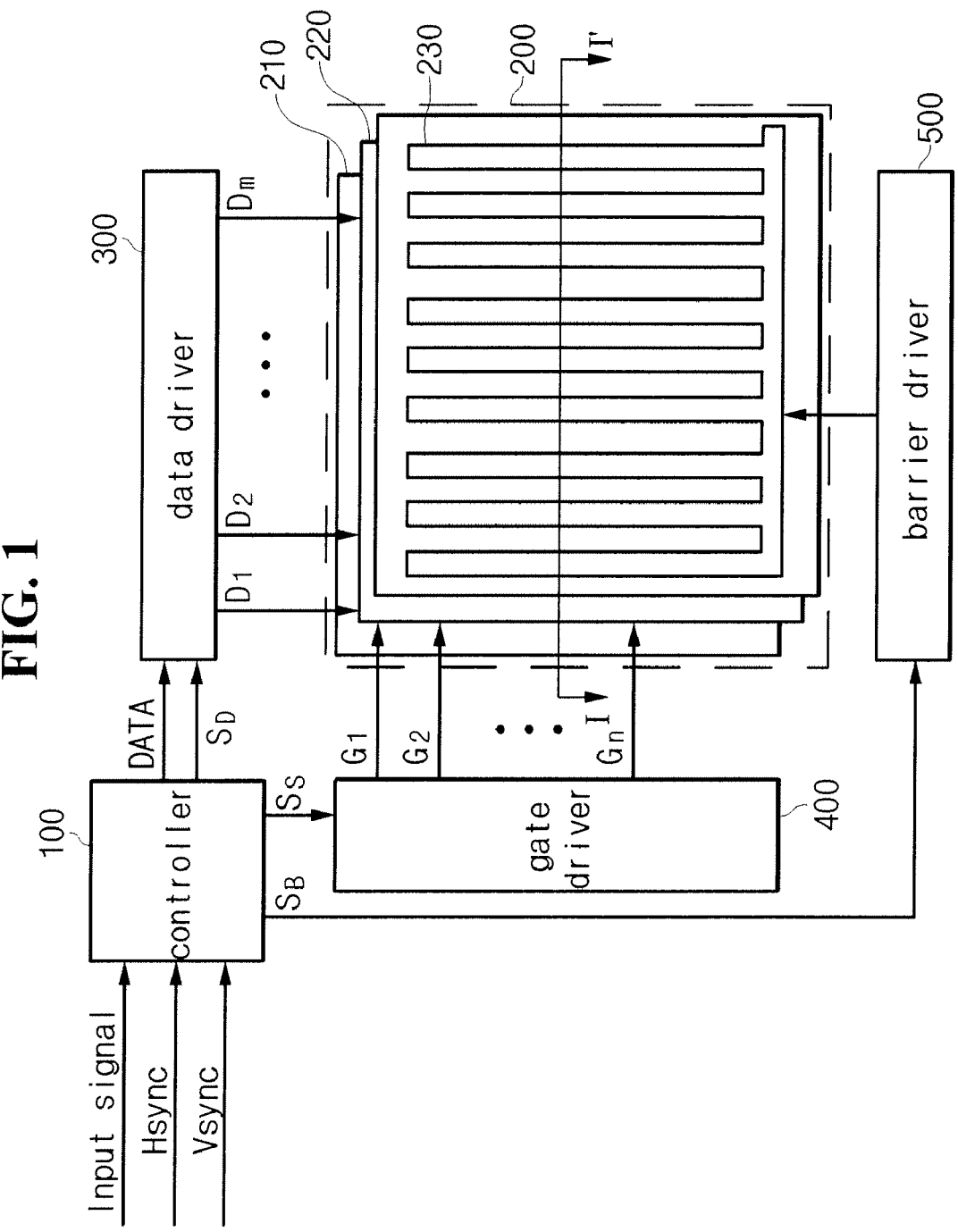
FIG. 1 is a block diagram illustrating major components of a 2D/3D image display device according to an exemplary embodiment of the present invention.

In the following detailed description, only certain exemplary embodiments of the present invention have been shown and described, simply by way of illustration. As those skilled in the art will realize, the embodiments described herein may be modified in various ways without departing from the spirit or scope of the present invention. Accordingly, the drawings and description are to be regarded as illustrative in nature and not restrictive. In addition, unless explicitly described to the contrary, the word "comprise" and variations such as "comprises" or "comprising," will be understood to imply the inclusion of stated elements but not the exclusion of any other elements. Like reference numerals designate like elements throughout the specification.

FIG. 1 is a block diagram illustrating the major components of a 2D/3D image display device according to an exemplary embodiment of the present invention. According to this embodiment, the display device includes a controller 100, a display unit 200, a data driver 300, a gate driver 400, and a barrier driver 500, and can selectively display a 2D image or a 3D image.

The controller 100 receives an input signal, a vertical synchronization signal Vsync, and a horizontal synchronization signal Hsync from the outside of the image display device. An input signal received by the controller 100 may be general 2D image data, 3D graphic data that are stereoscopically displayed on a plane (including 3D space coordinates and surface information of an object), or 3D projection data including image data of each view point.

A driving frequency, according to an exemplary embodiment of the present invention, is a frame rate in which an image of one frame is displayed during a unit time. For example, in one embodiment, if the driving frequency is 120 Hz, 120 frames are displayed in the display unit 200 each second. The controller 100 determines whether the input signal is a 2D image signal or a 3D image signal, and sets each different driving frequency for a period when a 2D image is displayed and for a period when a 3D image is displayed. Hereinafter, the driving frequency when a 2D image is displayed will be referred to as "a first driving frequency," and the driving frequency when a 3D image is displayed will be referred to as "a second driving frequency." As described below, according to one embodiment, the 2D/3D image display device sets the second driving frequency to be greater than the first driving frequency. Also, according to one embodiment, the 2D/3D image display device sets the second driving frequency to be double the first driving frequency in order to reduce or prevent a flicker phenomenon.

The controller 100 generates a data driver control signal $S_D$, an image data signal DATA, a gate driver control signal $S_S$, and a barrier driver control signal $S_B$ according to a vertical synchronization signal Vsync, a horizontal synchronization signal Hsync, and either one of the first or second driving frequencies. The controller 100 outputs the data driver control signal $S_D$ and the image data signal DATA to the data driver 300, outputs the gate driver control signal $S_S$ to the gate driver 400, and outputs the barrier driver control signal $S_B$ to the barrier driver 500.

The 2D/3D image display device according to an exemplary embodiment of the present invention displays an image using a liquid crystal layer element. According to this embodiment, the display unit 200 includes a light source 210, a liquid crystal display (LCD) panel 220, and a barrier 230. The components of the display unit 200 are stacked in order of the light source 210, the LCD panel 220, and the barrier 230. The barrier 230, according to one embodiment, is an optical element using a parallax barrier, however, is not limited thereto.

Figure 2:
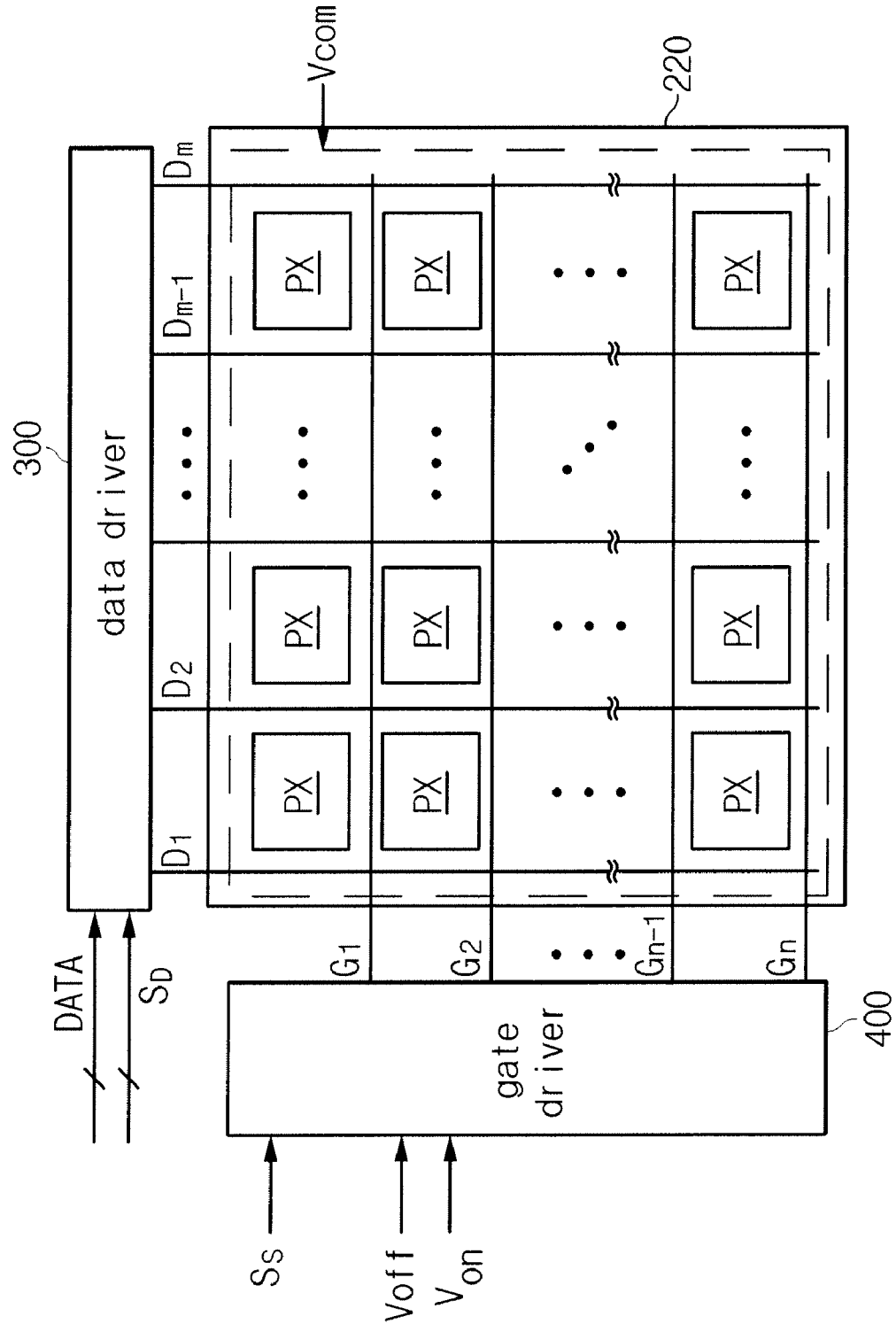
FIG. 2 is a block diagram illustrating the operation of a liquid crystal display (LCD) panel 220 according to an exemplary embodiment of the present invention.

FIG. 2 is a block diagram illustrating the operation of an LCD panel 220 according to an exemplary embodiment of the present invention. The LCD panel 220 is connected to the data driver 300 using a plurality of data lines, and video signals D1-Dm are transmitted to the pixels PX through the data lines. The video signals D1-Dm according to an exemplary embodiment of the present invention may be analog data voltages to which the image data signal DATA is converted.

Further, the LCD panel 220 is connected to the gate driver 400 using a plurality of gate lines, and receives gate signals G1-Gn through the gate lines. In this case, the gate signals G1-Gn control a switch, which allows the video signals D1-Dm to be transmitted to a liquid crystal layer element. That is, if a switch is electrically connected by the gate signals G1-Gn, the video signals D1-Dm are transmitted to the liquid crystal layer element, and if a switch is electrically disconnected by the gate signals G1-Gn, the video signals D1-Dm are not transmitted to the liquid crystal layer element.

The LCD panel 220 includes a plurality of gate lines that transmit gate signals, a plurality of data lines that are insulated from and that cross the plurality of gate lines, and a plurality of pixels PX that are formed at crossings of the plurality of gate lines and the plurality of data lines. In an exemplary embodiment of the present invention, it is assumed that a red subpixel for displaying red R, a green subpixel for displaying green G, and a blue subpixel for displaying blue B form one pixel PX. Further, in an exemplary embodiment of the present invention, a plurality of pixels PX of the LCD panel 220 includes pixels (hereinafter, 'left-eye pixels') corresponding to a left-eye image and pixels (hereinafter, 'right-eye pixels') corresponding to a right-eye image. The left-eye pixels and the right-eye pixels are repeatedly arranged. In more detail, the left-eye pixels and the right-eye pixels are repeatedly arranged in parallel to each other to form a stripe form or a zigzag form. Arrangement of the left-eye pixels and the right-eye pixels can be properly changed in correspondence to the barrier 230. Further, the barrier 230 can be suitably placed in correspondence to the arrangement of a plurality of left-eye pixels and right-eye pixels.

The data driver 300 generates video signals D1-Dm corresponding to an applied image data signal DATA and transmits the video signals D1-Dm to the data lines of the LCD panel 220 according to a data driver control signal $S_D$.

The gate driver 400 generates the gate signals G1-Gn and transmits the gate signals G1-Gn to the gate line of the LCD panel 220 according to the gate driver control signal $S_S$.

Figure 3:
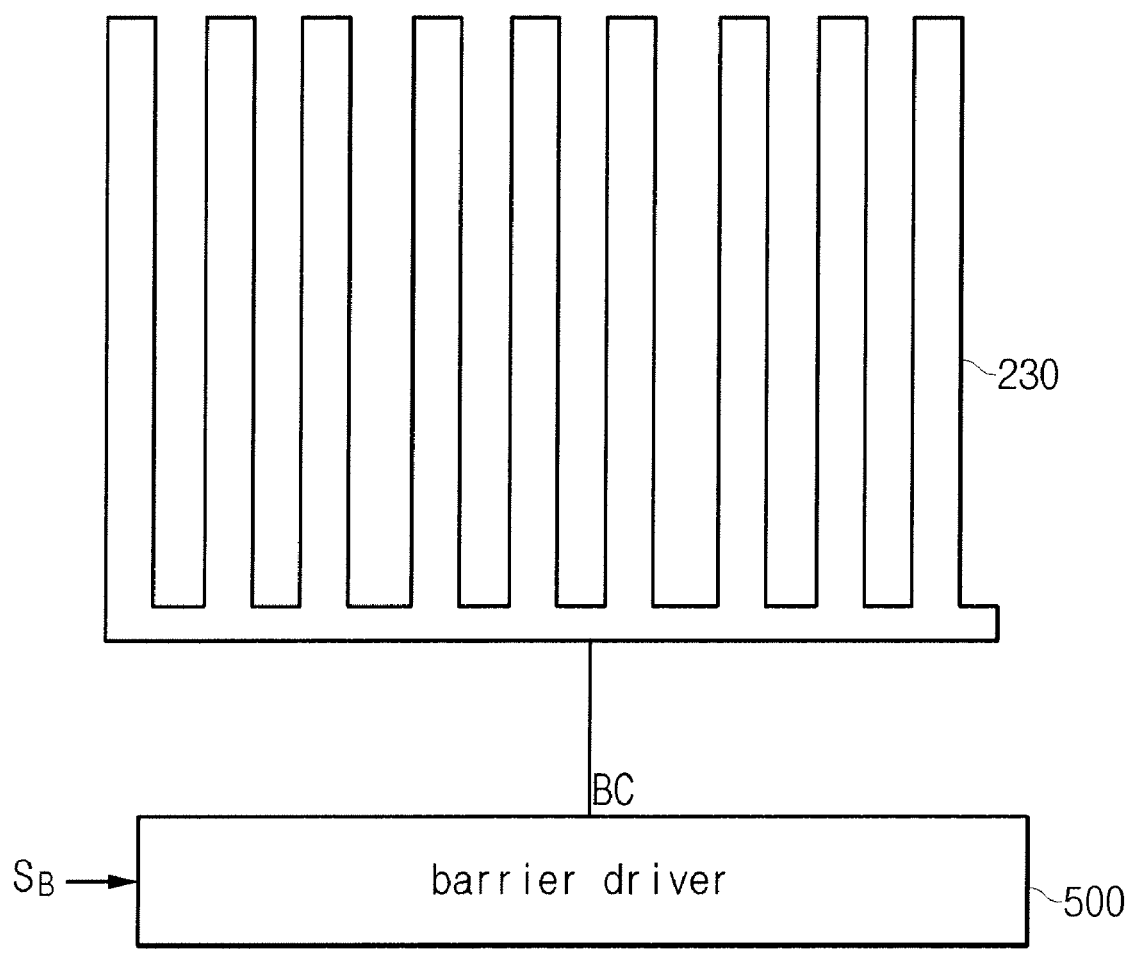
FIG. 3 is a diagram illustrating a barrier 230 and a barrier driver 500 according to an exemplary embodiment of the present invention.

FIG. 3 is a diagram illustrating a barrier 230 and a barrier driver 500 according to an exemplary embodiment of the present invention.

The barrier driver 500 transmits a barrier control signal BC to the barrier 230 according to a barrier driver control signal $S_B$. The barrier control signal BC according to an exemplary embodiment of the present invention is a signal having a voltage level of a driving voltage for driving a barrier electrode.

The barrier 230 receives a barrier control signal BC according to a 2D image signal or a 3D image signal from the barrier driver 500 and is driven according to the received barrier control signal BC. In an exemplary embodiment of the present invention, in a case where the barrier 230 is normally opaque, if a driving voltage is not applied, the barrier 230 is a non-transmission area. Alternatively, in a case where the barrier 230 is normally transparent, if a driving voltage is applied, the barrier 230 becomes a non-transmission area. That is, if a driving voltage is not applied, the barrier 230 is divided into a normally opaque barrier to be a non-transmission area and a normally transparent barrier to be a transmission area. Hereinafter, the driving of the barrier 230 is described in detail with reference to FIG. 4.

Figure 4:
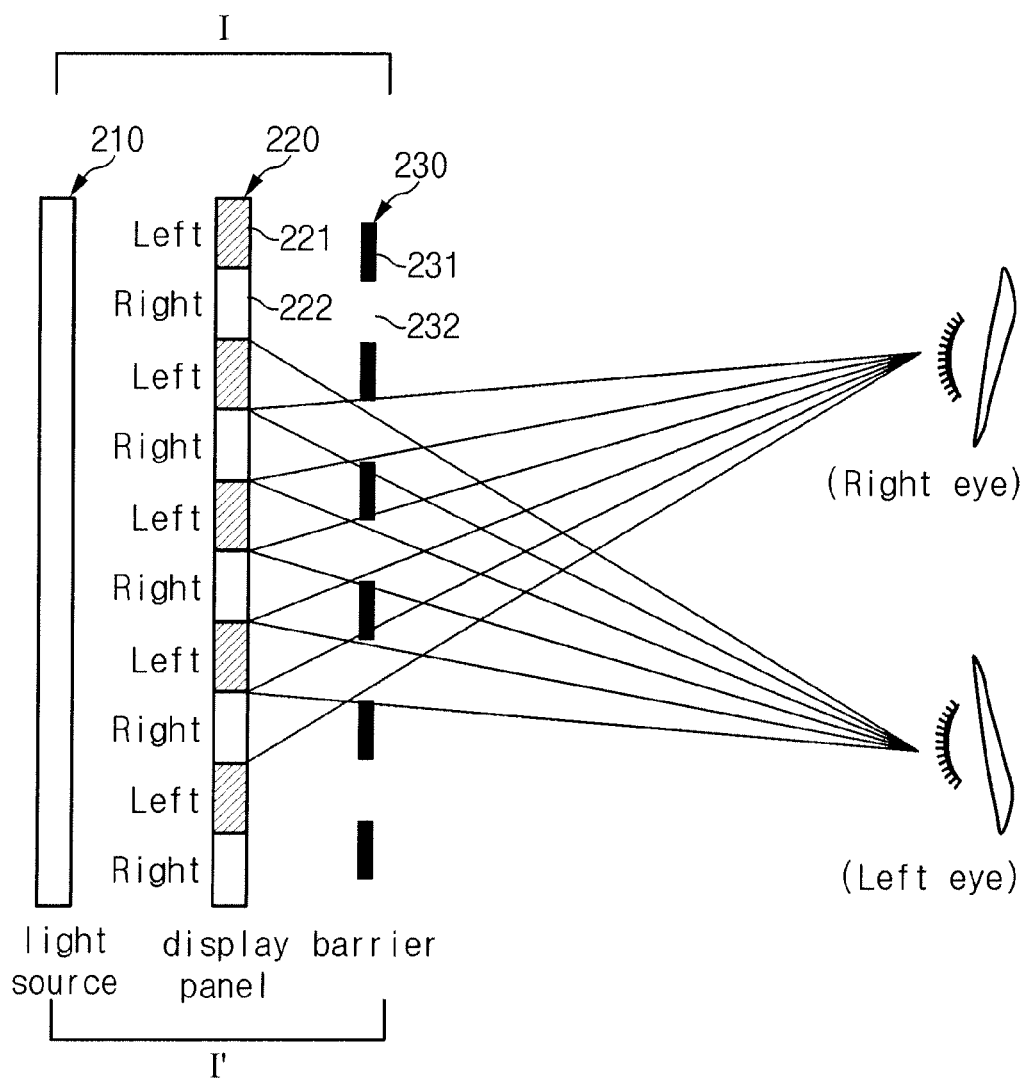
FIG. 4 is a cross-sectional view of a display unit 200 taken along line I-I' of FIG. 1.

FIG. 4 is a cross-sectional view of a display unit 200 taken along line I-I' of FIG. 1.

FIG. 4 shows a diagram in which a viewer views a 3D image through left-eye pixels and right-eye pixels using a cross-sectional view of the light source 210, the LCD panel 220, and the barrier 230 taken along line I-I' of FIG. 1.

As shown in FIG. 4, the LCD panel 220 includes a plurality of left-eye pixels 221 and a plurality of right-eye pixels 222 that are repeatedly arranged, and the barrier 230 includes non-transmission areas 231 and transmission areas 232 that are repeatedly arranged in parallel to the direction of arrangement of the plurality of left-eye pixels 221 and the plurality of right-eye pixels 222. A left-eye image of the left-eye pixels 221 of the LCD panel 220 is projected to a left eye through the transmission areas 232 of the barrier 230, and a right-eye image of the right-eye pixels 222 of the LCD panel 220 is projected to a right eye through the transmission areas 232 of the barrier 230. In this way, if the non-transmission areas 231 and the transmission areas 232 are alternately formed corresponding to the left-eye pixels 221 and the right-eye pixels 222, a light projecting path is formed in which the left-eye image of the left-eye pixels 221 and the right-eye image of the right-eye pixels 222 are projected to the left eye and the right eye, respectively, through the transmission areas 232.

For example, if a barrier control signal BC according to a 3D image signal is transmitted to the barrier 230, a left-eye image and a right-eye image that are included in the left-eye pixels 221 and the right-eye pixels 222 of the LCD panel 220 are divided into a left-eye image and a right-eye image by non-transmission areas 231 and transmission areas 232 of the barrier 230 and are respectively projected to the left eye and the right eye of the user.

Figure 5:
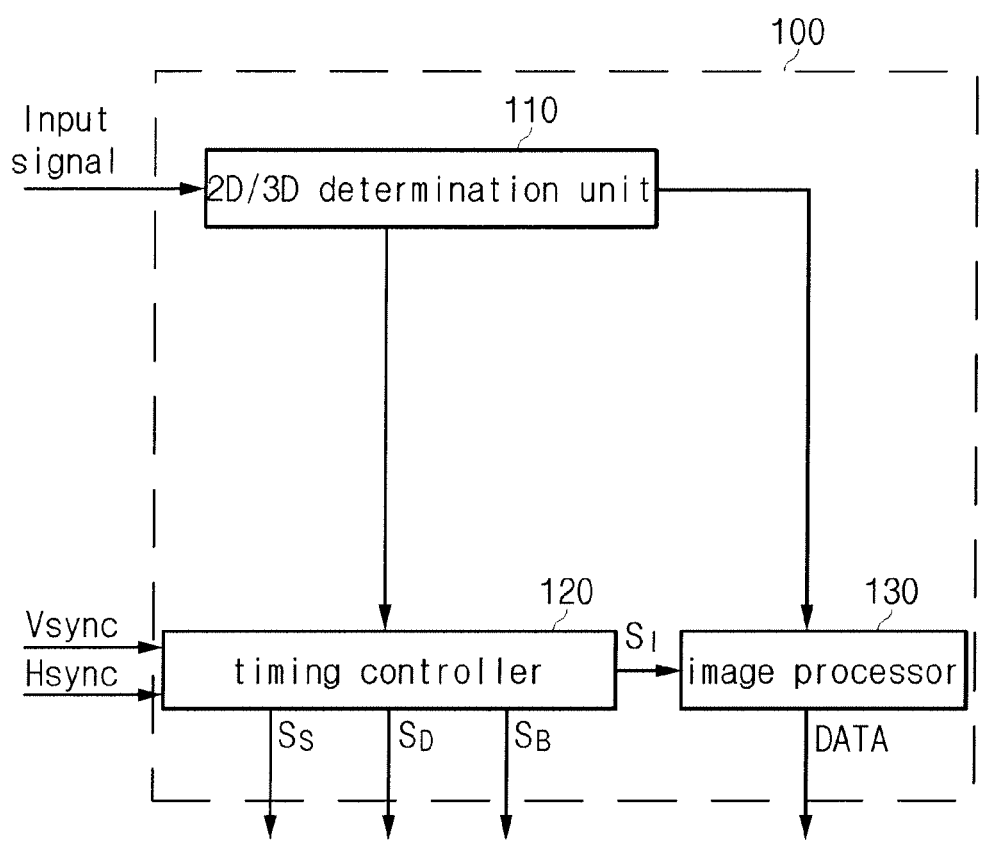
FIG. 5 is a block diagram illustrating a controller 100 according to an exemplary embodiment of the present invention.

FIG. 5 is a block diagram illustrating the configuration of a controller 100 according to an exemplary embodiment of the present invention.

As shown in FIG. 5, the controller 100 includes a 2D/3D determination unit 110, a timing controller 120, and an image processor 130.

The 2D/3D determination unit 110 determines whether a signal that is input from the outside of the 3D image display device is a 2D image signal or a 3D image signal. If a signal that is input from the outside of the 3D image display device is a 2D image signal, the 2D/3D determination unit 110 generates a first frequency control signal $S_{f1}$ and transmits the generated first frequency control signal $S_{f1}$ to the timing controller 120. If a signal that is input from the outside of the 3D image display device is a 3D image signal, the 2D/3D determination unit 110 generates a second frequency control signal $S_{f2}$ and transmits the generated second frequency control signal $S_{f2}$ to the timing controller 120. Further, the 2D/3D determination unit 110 transmits 2D image data or 3D image data that are included in the input signal to the image processor. The input signal according to an exemplary embodiment of the present invention includes a determination signal for determining a 2D or 3D image signal.

The timing controller 120 sets a driving frequency for each image signal according to a vertical synchronization signal Vsync, a horizontal synchronization signal Hsync, and a determined result of the input signal. Specifically, when the first frequency control signal $S_{f1}$ is transmitted, the timing controller 120 sets a first driving frequency. The first driving frequency according to an exemplary embodiment of the present invention is a driving frequency for displaying a 2D image, and generates and transmits a data driver control signal $S_D$, a gate driver control signal $S_S$, and a barrier driver control signal $S_B$ according to a horizontal synchronization signal Hsync and a vertical synchronization signal Vsync that are input from the outside of the 3D image display device. However, when the second frequency control signal $S_{f2}$ is transmitted, the timing controller 120 sets a second driving frequency that is greater than the first driving frequency. The timing controller 120 adjusts a horizontal synchronization signal Hsync and a vertical synchronization signal Vsync according to the second driving frequency. According to the adjusted horizontal synchronization signal Hsync and vertical synchronization signal Vsync, the timing controller 120 generates and transmits the data driver control signal $S_D$, the gate driver control signal $S_S$, and the barrier driver control signal $S_B$. Further, the timing controller 120 generates a data control signal $S_I$ and transmits the generated data control signal $S_I$ to the image processor 130, such that the image data signal DATA can be synchronously provided with the data driver control signal $S_D$, the gate driver control signal $S_S$, and the barrier driver control signal $S_B$.

The image processor 130 generates the image data signal DATA based on a 2D image signal or a 3D image signal that is transmitted from the 2D/3D determination unit 110. The image processor 130 synchronizes the image data signal DATA with the data control signal $S_I$ that is transmitted from the timing controller 120, and transmits the synchronized image data signal DATA.

Hereinafter, referring to FIGS. 6A and 6B, when an image of one frame is displayed according to the first or second driving frequency, application timing is described. In this case, for better understanding and ease of description, the first driving frequency is set to 60 Hz and the second driving frequency is set to 120 Hz.

Figure 6A:
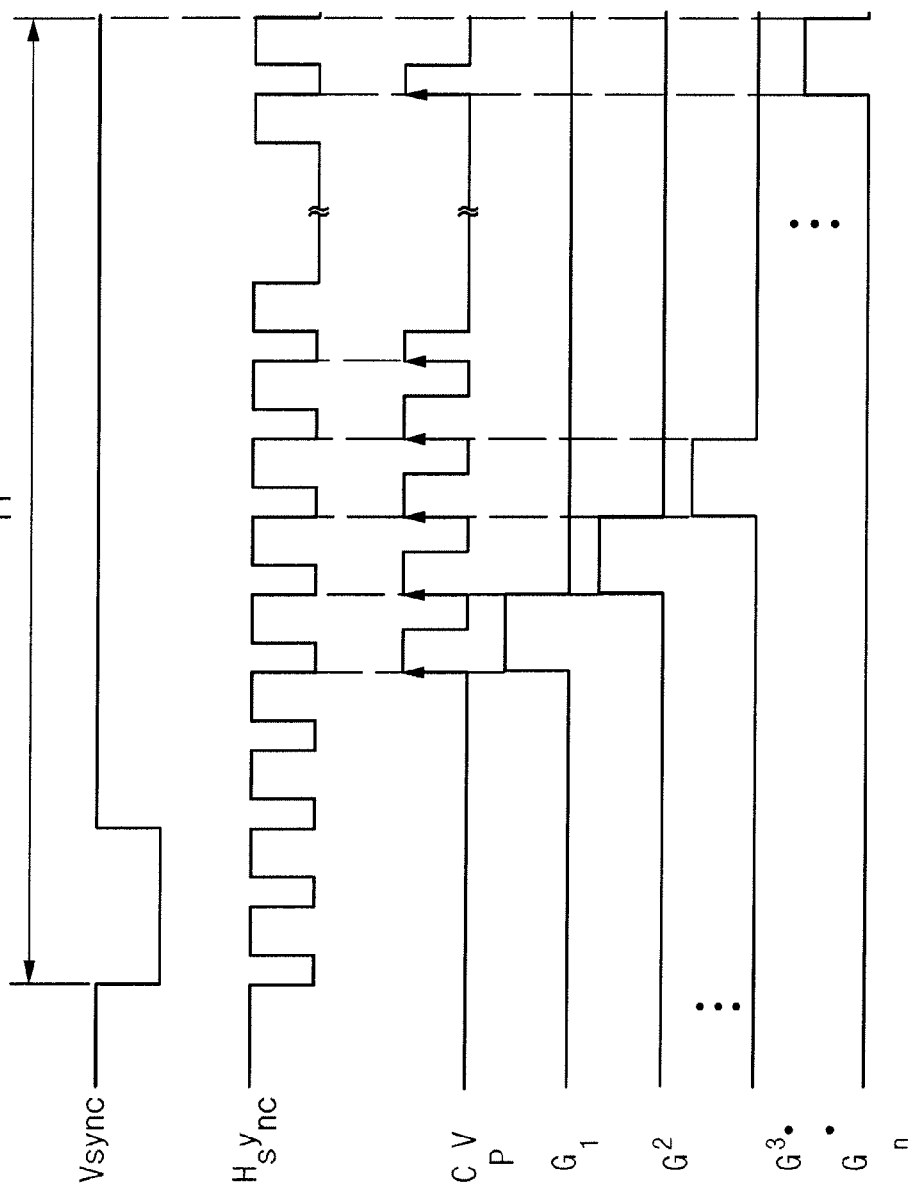
FIG. 6A is a timing diagram showing several signals when a first driving frequency is applied as according to an exemplary embodiment of the present invention.
Figure 6B:
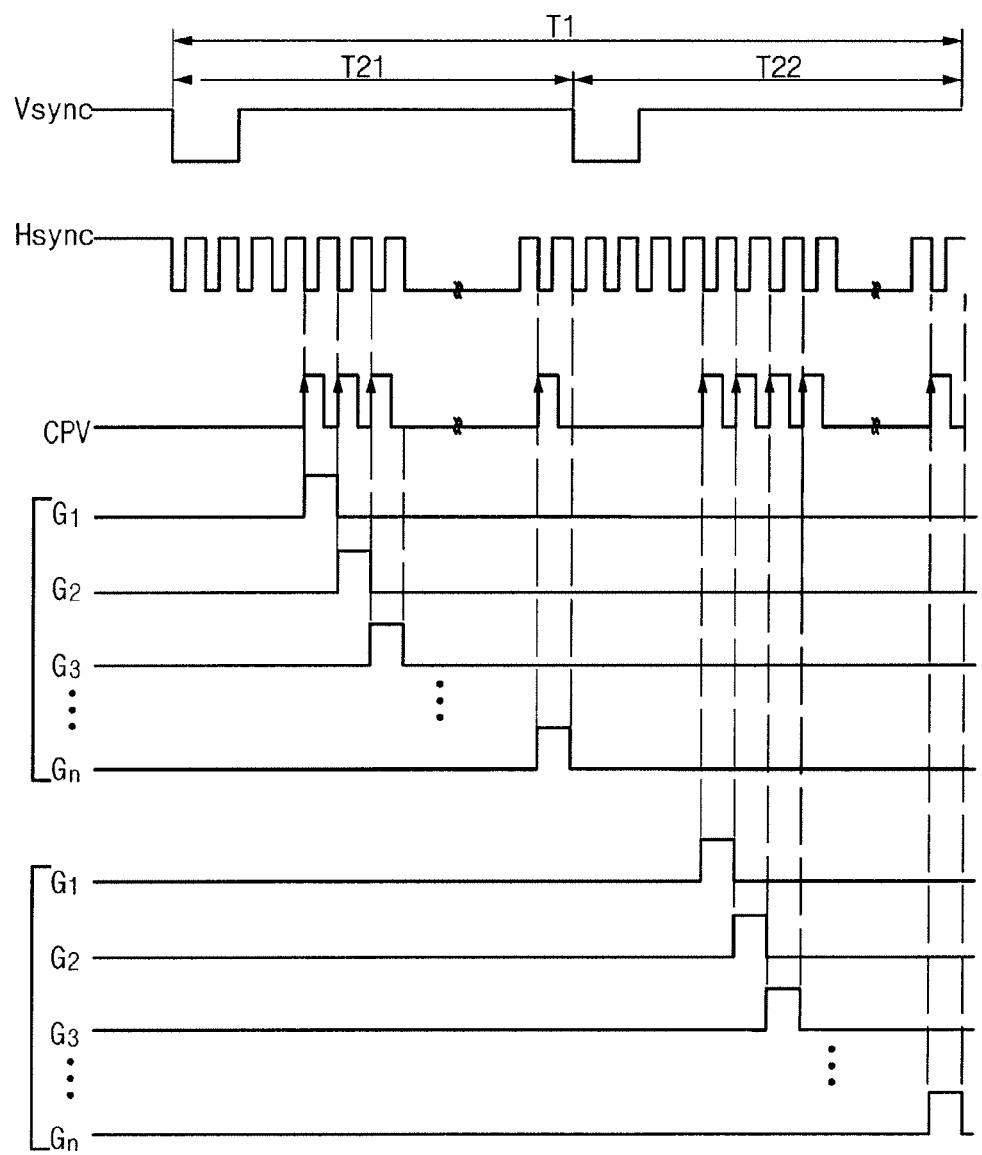
FIG. 6B is a timing diagram showing several signals when a second driving frequency is applied as according to an exemplary embodiment of the present invention.

FIGS. 6A and 6B show the vertical synchronization signal Vsync, the horizontal synchronization signal Hsync, the gate clock signal CPV, and the gate signals G1-Gn when the first driving frequency or the second driving frequency according to an exemplary embodiment of the present invention is applied.

In FIG. 6A, when an image of one frame is displayed by application of the first driving frequency, the gate signals G1-Gn are synchronized with rising edge timing of a gate clock signal CPV during a period T1 in which an image of one frame is displayed. The gate signals G1-Gn have a gate-on voltage for a period of the gate clock signal CPV. In this case, while each gate-on voltage is applied, video signals D1-Dm of an image to display through a plurality of data lines are transmitted to the LCD panel 220.

Alternatively, in FIG. 6B, an image of one frame is displayed by application of the second driving frequency, which is greater than the first driving frequency. The gate signals G1-Gn have a gate-on voltage for one cycle of a gate clock signal CPV, during a period T21 corresponding to ½ of a period T1 in which an image of one frame is displayed in FIG. 6A. While each gate-on voltage is applied, video signals D1-Dm of an image to display are transmitted to the LCD panel 220 through a plurality of data lines. In this case, a gate-on voltage can be applied a second time to gate signals G1-Gn during a period T22 corresponding to the remaining ½ of the period T1. When each gate-on voltage is applied a second time, video signals D1-Dm of an image to display can be transmitted again to the LCD panel 220. That is, when an image of one frame is displayed according to the second driving frequency, the same image data can be applied two times.

Below, referring to FIGS. 7A, 7B, 8A, and 8B, a method of reducing or removing a flicker phenomenon generated in the LCD panel 220 will be described.

Figure 7A:
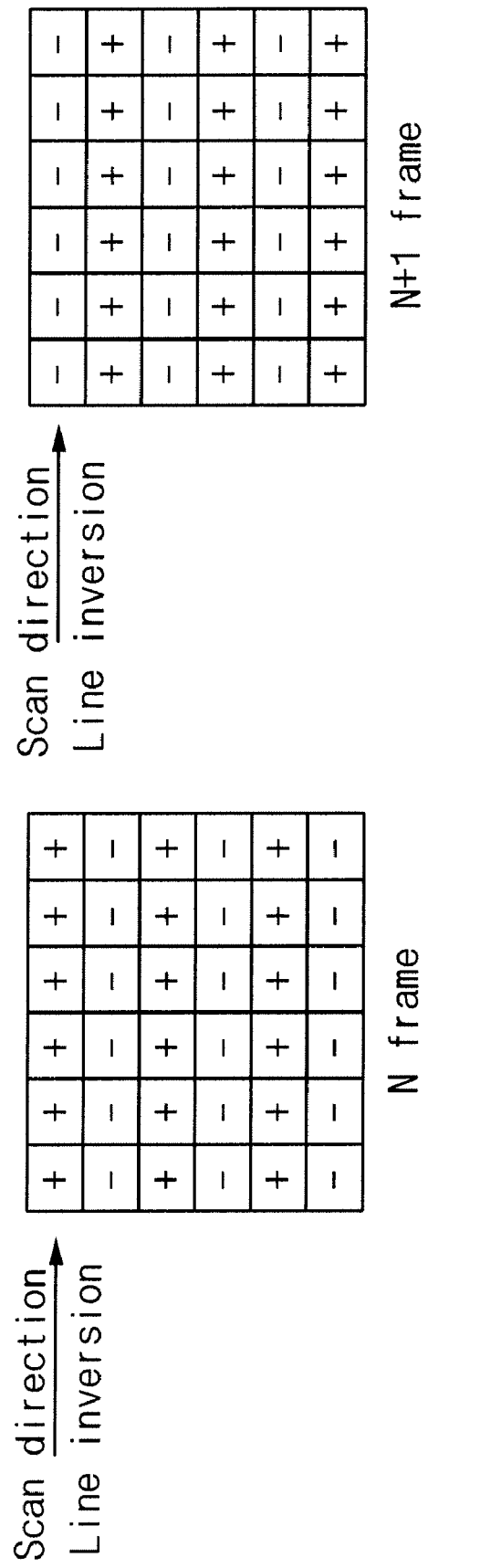
FIG. 7A is a diagram illustrating the polarity of a video signal for a frame image when a 2D image is displayed with the first driving frequency, according to an exemplary embodiment of the present invention.
Figure 7B:
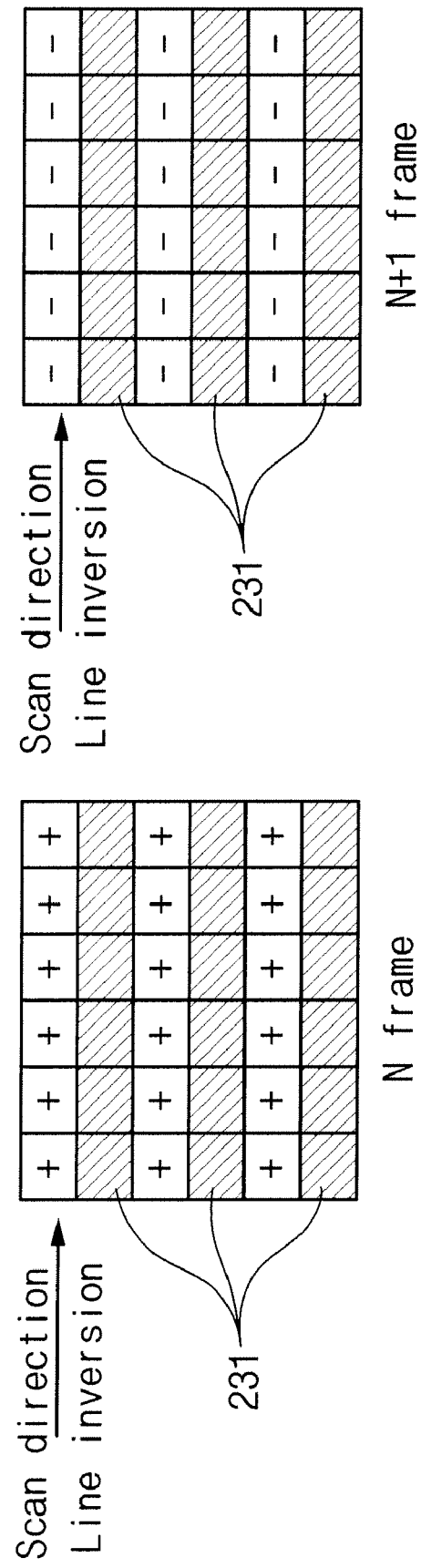
FIG. 7B is a diagram illustrating the polarity of a video signal for a frame image when a 3D image is displayed with the first driving frequency in the related art.

FIG. 7A is a diagram illustrating the polarity of a video signal for a frame image, when a 2D image is displayed with the first driving frequency according to an exemplary embodiment of the present invention. FIG. 7B is a diagram illustrating the polarity of a video signal for a frame image, when a 3D image is displayed with the first driving frequency in the related art.

In FIG. 7A, when a 2D image is displayed with the first driving frequency, video signals of an N-th frame image and a (N+1)-th frame image that are displayed according to line inversion include both positive (+) polarity and negative (−) polarity. The positive (+) polarity according to an exemplary embodiment of the present invention is the polarity of a signal having a voltage level higher than that of a common voltage Vcom when a voltage of a video signal is determined according to a line inversion driving method. The negative (−) polarity is the polarity of a signal having a voltage level lower than that of a common voltage Vcom when a voltage of a video signal is determined according to a line inversion driving method. That is, because the luminance of each pixel is determined by the potential difference between the positive (+) polarity and a common voltage Vcom, or negative (−) polarity and Vcom, using the line inversion method, even if a frame changes, the perceived luminance is sustained by the average, so a flicker phenomenon is not generated.

Alternatively, in FIG. 7B, a 3D image is displayed with the first driving frequency, and the barrier 230 of the display unit 200 is positioned in parallel to a scan direction. The barriers 230 are arranged in parallel at predetermined spaces, for example, to form non-transmission areas 231. In FIG. 7B, due to the barriers 230 that are positioned in parallel to the scan direction, a video signal of the N-th frame image that is displayed according to line inversion has positive (+) polarity, and a video signal of the (N+1)-th frame image has negative (−) polarity. That is, according to the line inversion driving method, the N-th frame displays an image with luminance according to a potential difference between a common voltage Vcom and positive (+) polarity, and the (N+1)-th frame displays an image with luminance according to a potential difference between a common voltage Vcom and negative (−) polarity. According to line inversion, the N-th frame and the (N+1)-th frame display images with luminance according to different polarities, and a flicker phenomenon is generated by a luminance difference between frames.

Below, a method of preventing the flicker phenomenon generated when displaying a 3D image is described with reference to FIGS. 8A and 8B.

Figure 8A:
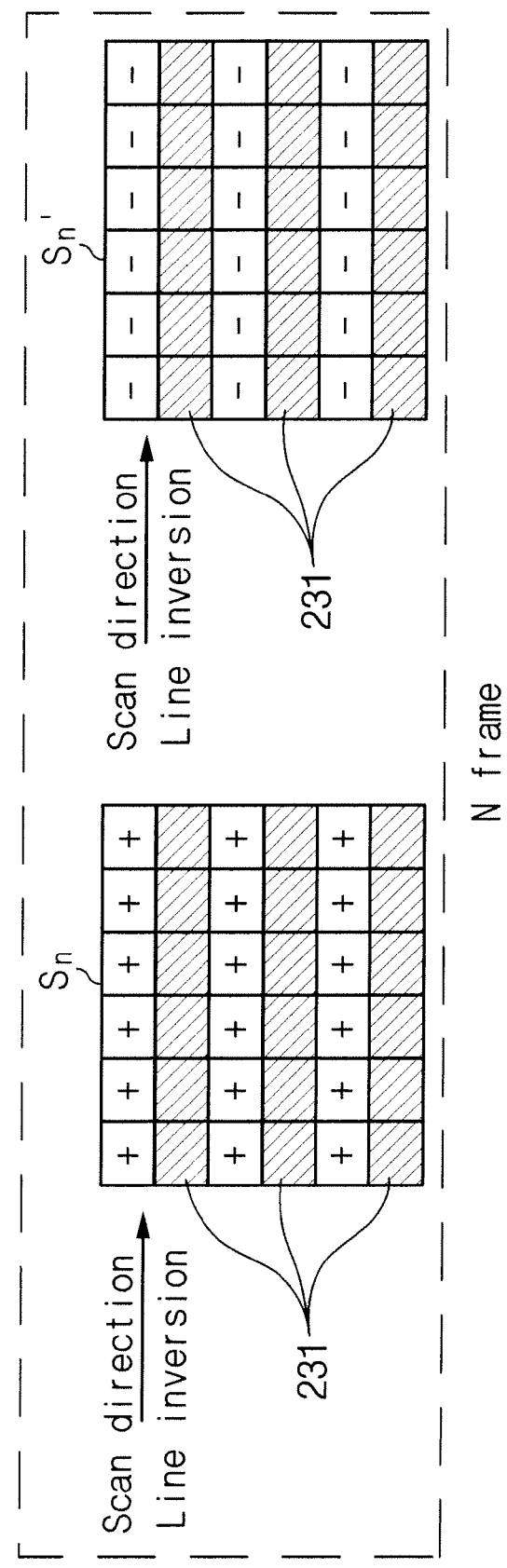

FIGS. 8A and 8B are diagrams illustrating the polarity of video signals of the N-th frame image and the (N+1)-th frame image, respectively, which are displayed to a viewer when the display unit 200 is operated according to the second driving frequency.

As shown in FIGS. 8A and 8B, the barrier 230 of the display unit 200 is positioned in parallel to a scan direction, and a plurality of barriers is arranged in parallel at predetermined spaces, for example, to form non-transmission areas 231.

In FIG. 8A, a video signal of the N-th frame image operating according to the second driving frequency becomes a first entire scan Sn and a second entire scan Sn'. In this case, after the first entire scan Sn is performed while a barrier 230 is positioned in parallel to a scan direction, a video signal of the N-th frame image has positive (+) polarity, and after the second entire scan Sn' is performed, a video signal of the N-th frame image has negative (−) polarity. That is, because a difference in luminance is generated according to the polarity of a video signal, one frame displaying the same image is divided into two periods and driven. For a first period, an image displayed according to the first entire scan Sn has a luminance that is determined by the potential difference between a common voltage Vcom and a video signal of positive (+) polarity. For a next period, an image displayed according to the second entire scan Sn' has a luminance that is determined by the potential difference between a common voltage Vcom and a video signal of negative (−) polarity. As a result, the N-th frame has an average of luminance that is displayed by a common voltage Vcom and a video signal of positive (+) polarity and luminance that is displayed by a common voltage Vcom and a video signal of negative (−) polarity, whereby a viewer recognizes that the entire luminance of the frame is constantly sustained. By such a driving method, the (N+1)-th frame of FIG. 8B also has an average of luminance that is displayed by a common voltage Vcom and a video signal of positive (+) polarity and luminance that is displayed by a common voltage Vcom and a video signal of negative (−) polarity, whereby a viewer recognizes that entire luminance of the frame is constantly sustained. Accordingly, because each luminance of the N-th frame and the (N+1)-th frame operating according to the second driving frequency is constantly sustained by average, even if a frame changes, a viewer does not recognize a flicker phenomenon.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the present invention, by controlling a driving frequency according to an input video signal, flicker phenomenon can be reduced or prevented.

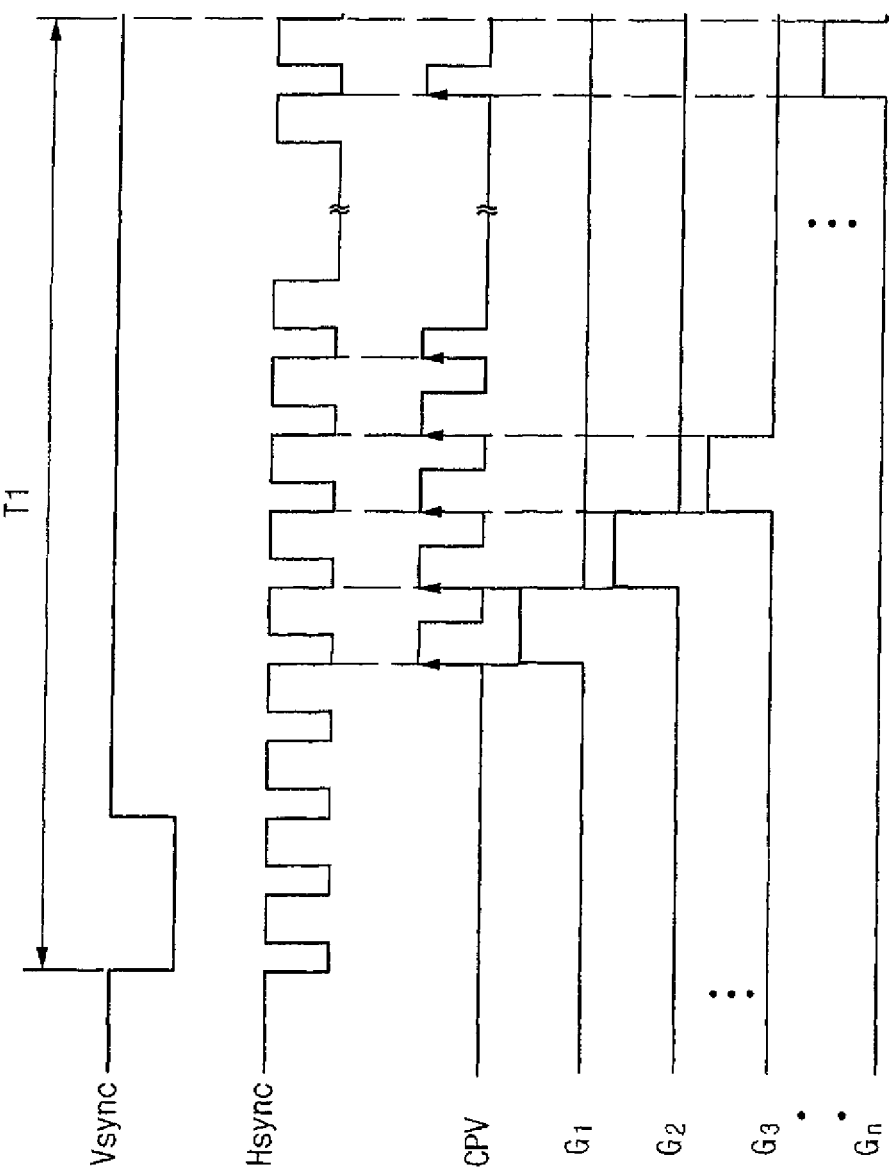

What is claimed is:

1. A 2D/3D image display device comprising:
    a display unit comprising a plurality of gate lines, a plurality of data lines, and a plurality of pixels, the plurality of gate lines crossing the plurality of data lines, and the plurality of pixels being coupled to the plurality of gate lines and the plurality of data lines; and
    a controller for receiving an input signal and for setting a driving frequency to be a first driving frequency or a second driving frequency according to the input signal, wherein the controller is configured such that if the driving frequency is the second driving frequency, then:
       the image display device displays same image data for each of a first period and a second period of one frame of an image, and a first video signal derived from the image data is transmitted to one of the plurality of pixels for the first period, the first video signal having a first polarity, and a second video signal derived from the image data is transmitted to the one of the plurality of pixels for the second period, the second video signal having a second polarity.

2. The 2D/3D image display device of claim 1, wherein the image of one frame is displayed with luminance according to a potential difference between the first polarity and a common voltage for the first period, and with luminance according to a potential difference between the second polarity and the common voltage for the second period.

3. The 2D/3D image display device of claim 2, wherein the first polarity is a signal having a voltage level higher than that of the common voltage; and
the second polarity is a signal having a voltage level lower than that of the common voltage.

4. The 2D/3D image display device of claim 2, wherein the first polarity is a signal having a voltage lower than that of the common voltage; and
the second polarity is a signal having a voltage level higher than that of the common voltage.

5. The 2D/3D image display device of claim 1, wherein the second driving frequency is higher than the first driving frequency.

6. The 2D/3D image display device of claim 5, wherein the first driving frequency is a frame rate of the one frame, and the second driving frequency is double the frame rate of the one frame.

7. The 2D/3D image display device of claim 1, wherein the controller comprises:
a 2D/3D determination unit for determining whether the input signal is a 2D image signal or a 3D image signal, and transmitting a determined result to a timing controller;
a timing controller for setting the driving frequency to the first driving frequency when a 2D image is displayed according to the 2D image signal, or setting the driving frequency to the second driving frequency when a 3D image is displayed according to the 3D image signal; and
an image processor for generating 2D image data based on the 2D image signal, or 3D image data based on the 3D image signal.

8. The 2D/3D image display device of claim 1, wherein the display unit comprises a barrier, placed in correspondence to the arrangement of a plurality of left eye pixels and right eye pixels from among the plurality of pixels, to enable perception of a 3D image.

9. The 2D/3D image display device of claim 8, wherein, according to a barrier control signal, if the input signal is a 2D image signal, the barrier is set to a transmission area, and if the input signal is a 3D image signal, the barrier is set to a suitable arrangement of transmission areas and non-transmission areas.

10. A method of driving a 2D/3D display device including a display unit for displaying a 2D image or 3D image according to an input signal, the method comprising:
determining whether the input signal is a 2D image signal or a 3D image signal;
driving, if the input signal is the 2D image signal, with a first driving frequency for a period in which the 2D image is displayed according to the 2D image signal;
driving, if the input signal is the 3D image signal, with a second driving frequency, which is different from the first driving frequency, for a period in which the 3D image is displayed according to the 3D image signal; and
displaying image data of the input signal according to the first driving frequency or the second driving frequency.

11. The method of claim 10, further comprising:
generating and transmitting the image data corresponding to each of the first driving frequency and the second driving frequency; and
generating and transmitting a control signal for controlling the display unit according to the first driving frequency or the second driving frequency.

12. The method of claim 11, wherein the second driving frequency is greater than the first driving frequency.

13. The method of claim 12, wherein the first driving frequency is a frame rate of one frame of an image, and the second driving frequency is double the frame rate of the one frame.

14. A 3D image display device comprising:
a display unit comprising a plurality of gate lines, a plurality of data lines, and a plurality of pixels, the plurality of gate lines crossing the plurality of data lines, and the plurality of pixels being coupled to the plurality of gate lines and the plurality of data lines; and
a controller for receiving an input signal and for setting a driving frequency,
wherein the controller is configured such that:
the image display device displays same image data for each of a first period and a second period of one frame of an image, and
a first video signal derived from the image data is transmitted to one of the plurality of pixels for the first period, the first video signal having a first polarity, and a second video signal derived from the image data is transmitted to the one of the plurality of pixels for the second period, the second video signal having a second polarity.

15. The 3D image display device of claim 14, wherein the image of one frame is displayed with luminance according to a potential difference between the first polarity and a common voltage for the first period, and with luminance according to a potential difference between the second polarity and the common voltage for the second period.

16. The 3D image display device of claim 15, wherein the first polarity is a signal having a voltage level higher than that of the common voltage; and
the second polarity is a signal having a voltage level lower than that of the common voltage.

17. The 3D image display device of claim 15, wherein the first polarity is a signal having a voltage level lower than that of the common voltage; and
the second polarity is a signal having a voltage level higher than that of the common voltage.

18. The 3D image display device of claim 14, wherein the driving frequency is double a frame rate of the one frame.

19. The 3D image display device of claim 14, wherein the controller comprises an image processor for generating 3D image data based on the input signal.

20. The 3D image display device of claim 14, wherein the display unit comprises a barrier that is placed in correspondence to the arrangement of a plurality of left eye pixels and right eye pixels from among the plurality of pixels, to enable perception of a 3D image.

* * * * *

UNITED STATES PATENT AND TRADEMARK OFFICE
CERTIFICATE OF CORRECTION

PATENT NO.        : 8,040,307 B2
APPLICATION NO.   : 11/940957
DATED             : October 18, 2011
INVENTOR(S)       : Beom-Shik Kim et al.

It is certified that error appears in the above-identified patent and that said Letters Patent is hereby corrected as shown below:

In the Drawings

FIG. 6A, Sheet 6 of 11        Delete Drawing Sheet 6 and substitute therefore the Drawing Sheet, consisting of Fig. 6A, as shown on the attached page Signed and Sealed this
Second Day of July, 2013

Teresa Stanek Rea
*Acting Director of the United States Patent and Trademark Office*